Jan. 22, 1957 G. B. DOREY 2,778,319
HOPPER DISCHARGE OUTLET
Filed Oct. 12, 1951 5 Sheets-Sheet 5
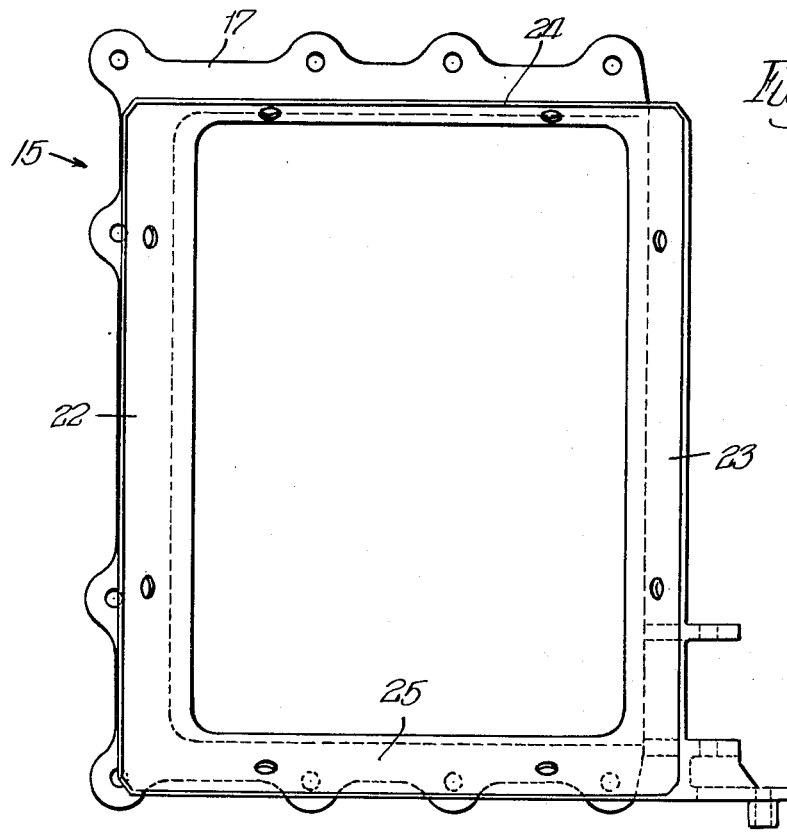
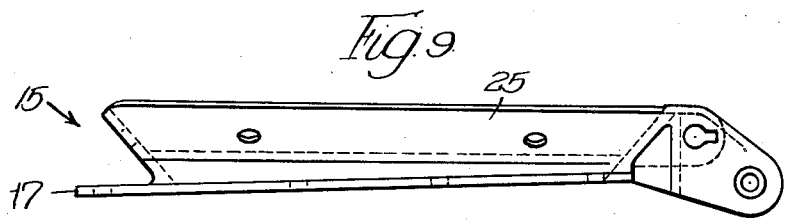
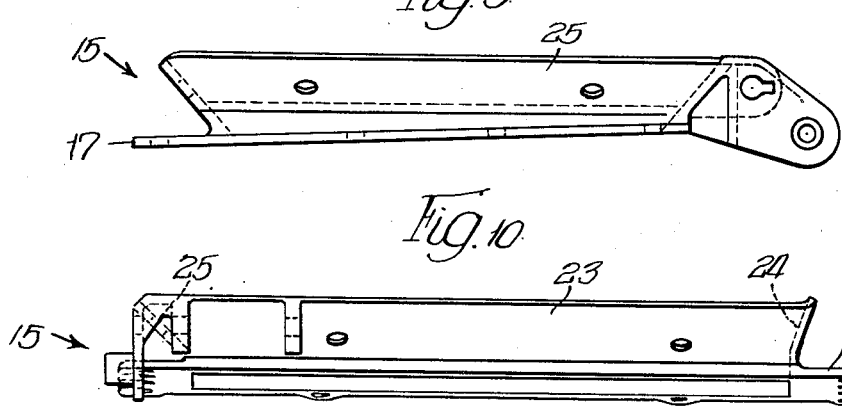
INVENTOR.
George B. Dorey,
BY
Robert R. Lockwood
ATTY United States Patent Office 2,778,319
Patented Jan. 22, 1957

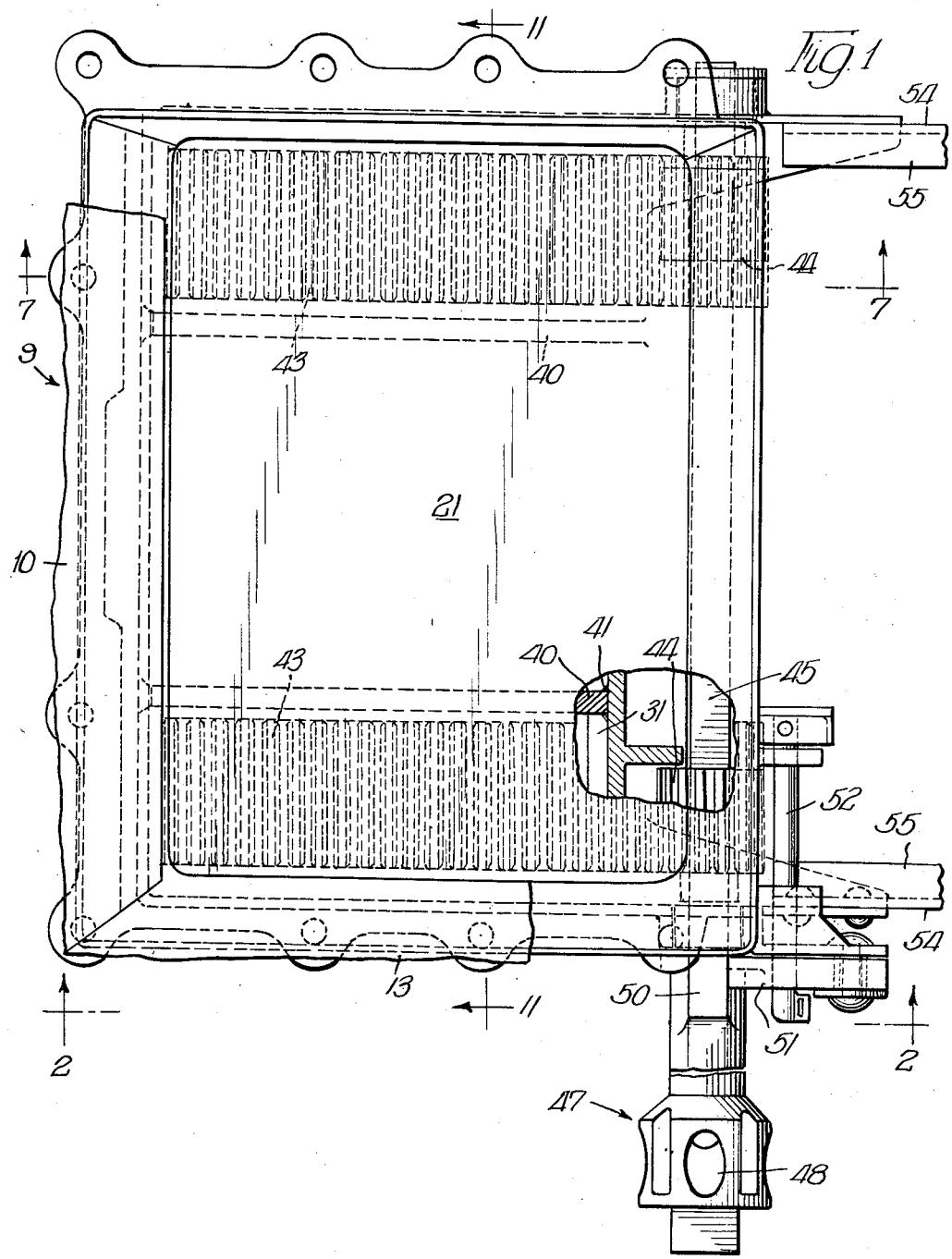

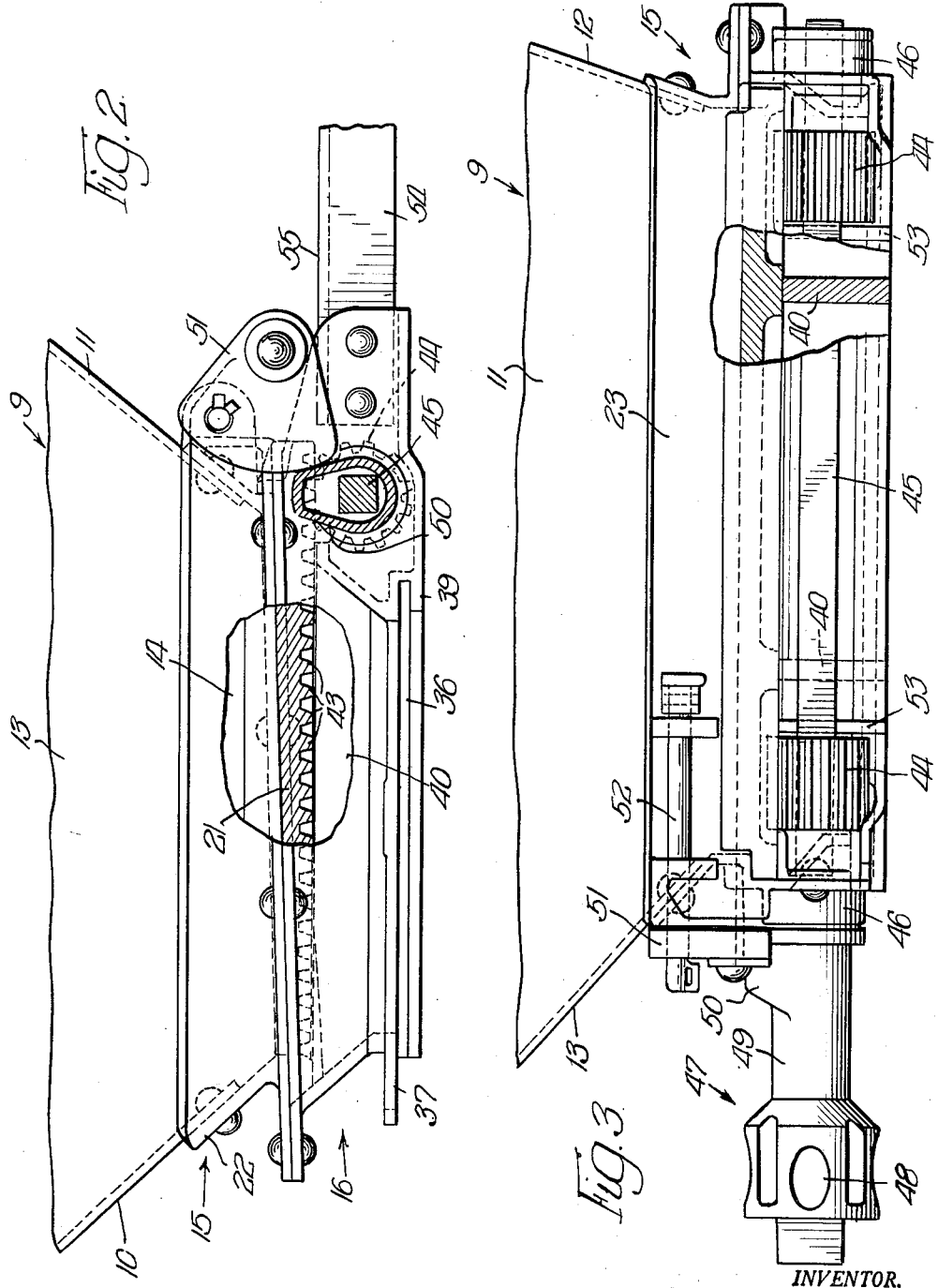

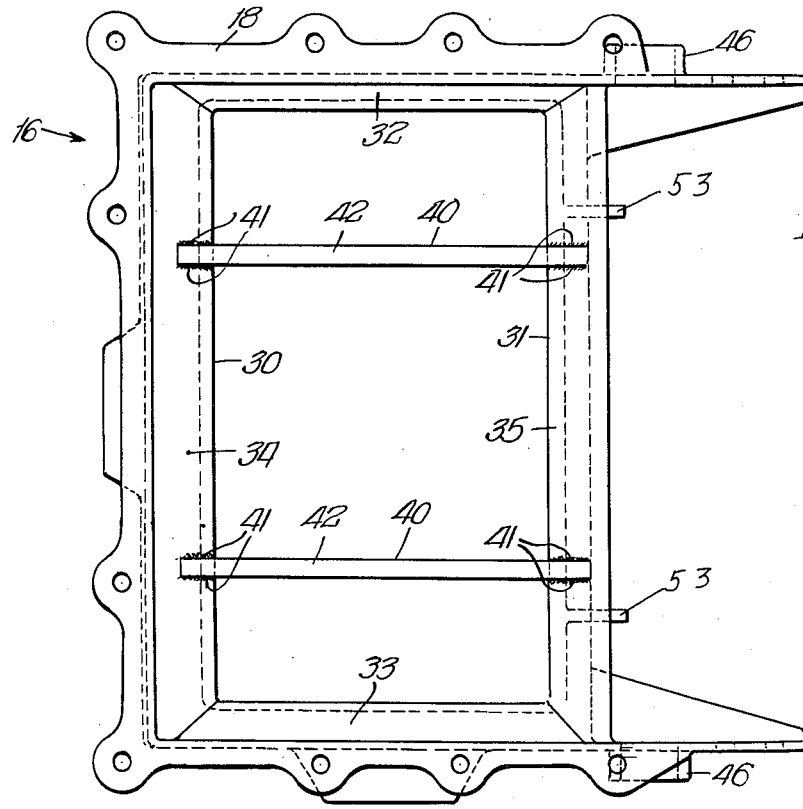
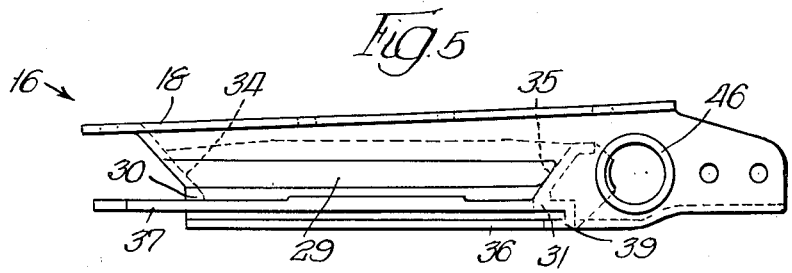
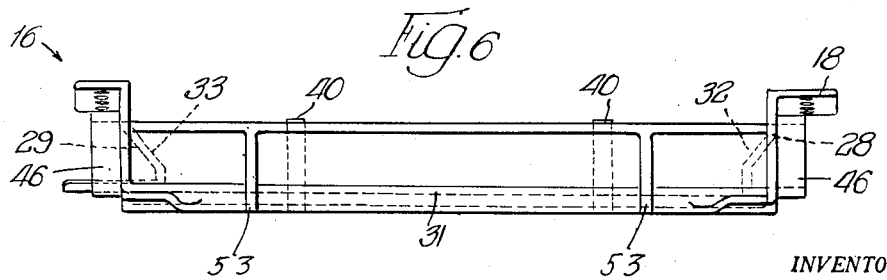

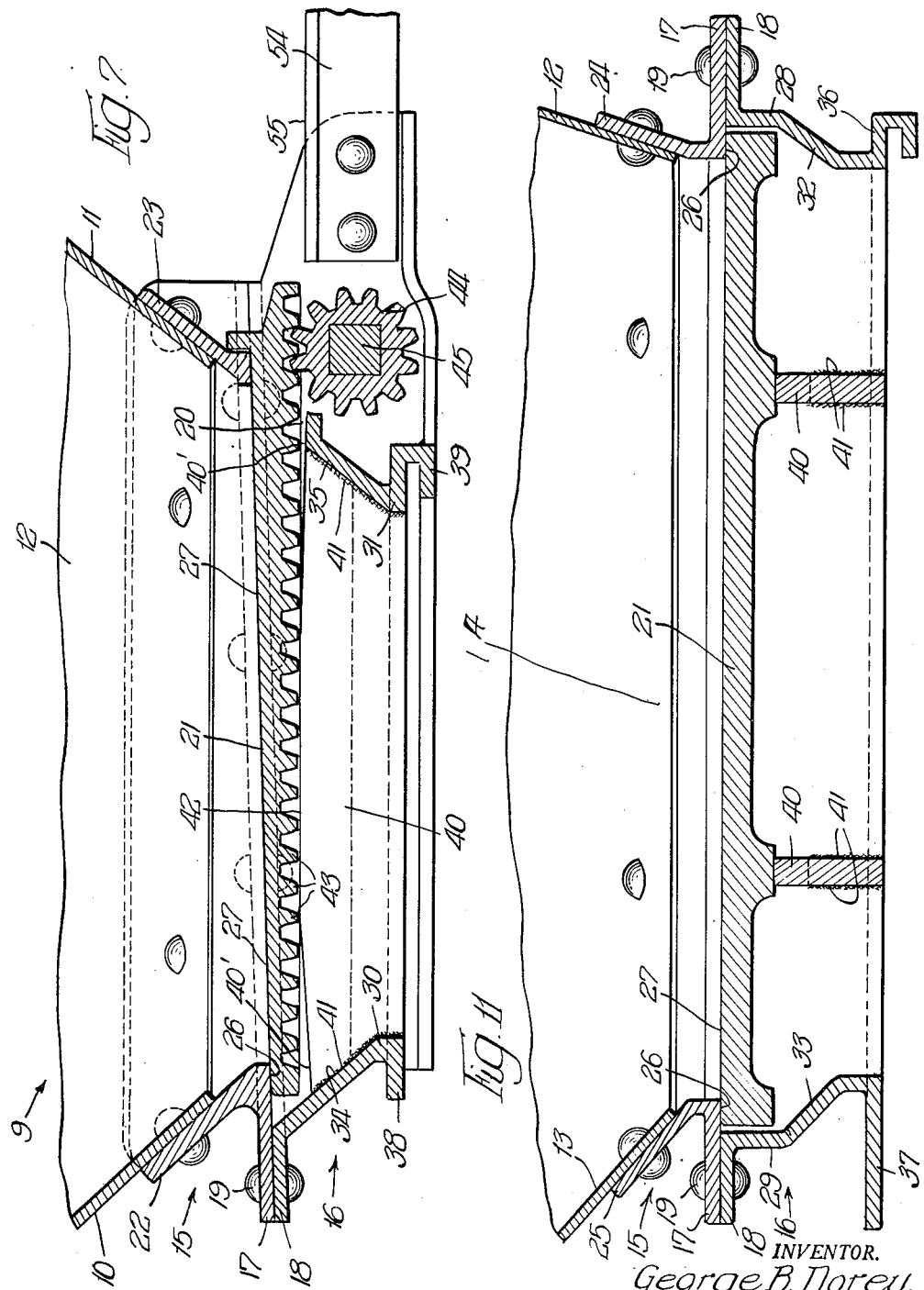

2,778,319
HOPPER DISCHARGE OUTLET

George B. Dorey, Westmount, Quebec, Canada, assignor to Enterprise Railway Equipment Company, Chicago, Ill., a corporation of Illinois Application October 12, 1951, Serial No. 251,032

5 Claims. (Cl. 105—282)

This invention relates to an improved hopper discharge outlet for controlling the size of a discharge opening and is of the type employing a sliding gate for varying the size of the opening and effecting complete closure of said opening.

The invention is by way of an improvement on the conventional type of outlet wherein a sliding gate is slidably mounted on guides adjacent the side walls of the opening and wherein there is a tendency for lading to pack between the gate and supporting guides. It is an object of this invention, among others, to remedy this condition by mounting a sliding gate to slide on rails spaced away from the side walls of the opening in such a manner that any lading retained by the rails will be readily displaced to either side thereof as the said gate is moved towards closed position; another object of the invention is to provide an outlet structure employing a sliding gate so moutned in a frame as to provide for close sealing cooperation between the upper surface of the gate and the under surface of the bounding marginal walls defining the opening; to provide an improved structure for wedging the gate upwardly into sealing relation with the frame by longitudinal movement of said gate; to provide a two-piece frame structure which may be easily machined to obtain smooth bearing surfaces and readily assembled to function as a unitary structure; and to provide a structure which will permit of a limited degree of flexure of the gate beyond its supporting structure in order to obtain tight sealing contact between the gate and frame.

For further comprehension of the invention reference may be had to the accompanying drawings wherein the improved structure is shown as applied to the lower portion of the load containing hopper of a railway car.

In said drawings:

Figure 1 shows a plan view of the hopper structure showing as much of the hopper construction as necessary to illustrate the outlet and its application to the hopper and partly broken away to better illustrate the construction.

Figure 2 is a side elevational view of the structure shown in Figure 1 as viewed on a line 2—2 of said Figure 1 and with certain parts broken away to better illustrate the construction.

Figure 3 is a vertical end elevational view of the outlet structure shown in Figure 2 as viewed from right to left.

Figure 4 is a plan view of the lower portion of the frame structure.

Figure 5 is a longitudinal elevational view of Figure 4.

Figure 6 is a vertical end elevational view of Figure 4.

Figure 7 is a longitudinal vertical sectional view taken on a line 7—7 of Figure 1.

Figure 8 is a plan view of the upper portion of the frame structure.

Figure 9 is a vertical longitudinal side view of Figure 8.

Figure 10 is a vertical end view of the structure shown in Figure 9.

Figure 11 is a vertical transverse longitudinal sectional view taken on a line 11—11 of Figure 1.

In said drawings the load containing hopper 9 is indicated as a four sided hopper including end walls 10 and 11 which meet with inner and outer side walls as indicated at 12 and 13 respectively to form a discharge opening 14. Surrounding the lower portion of the opening is a frame structure including upper and lower frame members as indicated at 15 and 16 respectively, said respective members being each formed with outstanding laterally extending flanges 17 and 18 respectively which are riveted together or otherwise secured as at 19 to function as a unitary structure. The flanges 17 and 18 extend along three sides of the opening and on the fourth side there is provided an opening 20, Figure 7, through which a sliding gate 21 extends to close the discharge opening 14.

The upper frame member, Figures 8, 9 and 10, includes walls 22, 23, 24 and 25 which respectively overlie walls 10, 11, 12 and 13 of the hopper 9 and said walls at their lower margin present an abutting face as indicated at 26, Figure 11, with which the upper surface 27 of the gate 21 is arranged to engage when the latter is in closed position. The lower marginal abutting face 26 is preferably disposed on a level to coincide with the under surface of flange 17 thus permitting complete finishing of the surface around the four sides of the opening in one machining operation.

The lower frame member 16, Figures 4, 5 and 6, includes a chute-like portion including inner and outer side walls indicated at 28 and 29 respectively which meet with transversely extending end walls 30 and 31 and thus form a four sided chute-like structure of appreciable depth. The said walls 28, 29, 30 and 31 include sloping floor sections as indicated at 32, 33, 34 and 35 respectively, Figures 7 and 11, and surrounding the chute-like structure are laterally outwardly extending marginal portions as indicated at 36, 37, 38 and 39 respectively to which a conventional discharge chute can be clamped.

Extending between the end walls 30 and 31 and spaced inwardly from the frame side walls 24 and 25 are supporting rail members 40—40, Figure 11, which are preferably welded at each end to the end walls 30 and 31 at 41. The said rail members 40 being spaced inwardly from the sides of the lower frame members 16 a limited distance serve to divide the hopper opening 14 in three sections and provide a grill-like support for the gate 21.

The main portion of the upper surface 42 of each rail 40 preferably extends horizontally whereas the upper surface 27 of the gate as well as the interengaging abutting surface 26 of the upper frame member 15 extends at an angle to the said surface 42 to provide a wedge shaped gate 21, Figure 7, which is wedgingly forced between the rail members 40 and the inclined surface 26 of the frame member to thereby provide tightly fitting engagement between the frame surface 26 and the gate 21.

The horizontal upper bearing surface 42 of the rails 40, as shown in Figure 7, preferably terminates at an appreciable distance from the ends of the gate 21, as at 40', thus providing for an appreciable length of gate overhang beyond the ends of the flat bearing surfaces 42 of the rail members 40 and thereby allowing for a limited lengthwise springing movement of the gate 21. The spacing of the rail members 40 transversely away from the frame abutting surfaces 26 likewise provides for a limited degree of bending of the gate 21 transversely to its direction of movement. The slight permissible flexure of the gate 21 thus provided by the overhanging length of gate both longitudinally and transversely thus assures for a tight sealing connection between the upper surface 27 of the gate 21 and the abutting under surface 26 of the upper frame member 15.

Longitudinal movement of the gate 21 is effected by means of interengaging rack and pinion means carried by the gate and frame respectively, said rack means including a series of rack teeth 43 formed on the under side of the gate and the pinion means includes a pair of geared pinions 44—44 non-rotatably mounted on an operating shaft 45 which is journalled in bearings 46 formed at the respective sides of the lower frame member 16. At the outer side of the hopper 9 the shaft 45 is fitted with an operating head 47, Figure 3, having a series of socket openings 48 for receiving an operating bar (not shown) for effecting rotation of the shaft. The head 48 is formed with an elongated body section 49 having a lug 50 with which a pivoted locking dog 51 engages to maintain the shaft against reverse rotation. The dog 51 is adapted to be retained in position by a locking and sealing pin 52 which extends through the upper frame member 15 and dog 51. The pinions 44 are held against inward longitudinal movement on the shaft 45 by means of webs 53 and against outward movement by the side walls of the lower frame member 16.

The gate 21 is arranged to be supported in open position by means of a pair of extension rail members 54—54 which are secured to the sides of the lower frame member 16 and disposed to underlie the sides of the gate. The upper bearing surface 55 of the rail member 54 is disposed in alignment with the upper bearing surfaces 42 of the rail members 40 and consequently, as the gate 21 is moved to open position, the tapering construction thereof as provided by the inclined upper surface 27 provides for the recession of said surface away from the lading and facilitates the opening movement of the gate 21 in the event of the lading being compacted.

The spacing of the supporting rail members 40 away from the side walls 28 and 29 of the opening 14 allows the ready displacement of any lading which is normally retained on the upper surfaces 42 of the rails 40 and thus prevents binding on account of compacted lading at the sides of the frame. The positioning of the supporting rails 40 inwardly of the side walls 28 and 29 provides adequate intermediate supports for the gate 21 to prevent bending and sagging thereof and thus permits the use of a comparatively flexible gate member and one which will permit of that portion of the gate which overhangs the rail members 40 to readily flex and resiliently engage with the lower surface 26 of the upper frame member 15.

What is claimed is as follows:

1. In a discharge outlet including a four sided opening defined in part by walls having a marginal edge surface extending around the opening, a sliding gate movably mounted to close the opening adapted to engage said marginal edge, and supporting means for the gate including a pair of rail members extending lengthwise in the direction of movement of the gate and spaced from the side edges of the opening to provide a discharge area on each side of the rails and constituting the sole support for said gate in its closed position.

2. In a discharge outlet including a four-sided opening defined in part by walls having a marginal edge surface extending around the opening; a sliding gate movably mounted to close the opening and having an upper surface arranged to engage the marginal edges of the hopper walls, and supporting means for the gate in closed position consisting of rail members extending lengthwise in the direction of movement of the gate and laterally spaced from the side edges of the opening to provide a discharge area on each side of the rails, said upper surface of the gate and the co-operating marginal edges of the frame walls extending at an angle to the supporting surface of the rail members to provide a wedging action whereby said gate is adapted to be forced into tight wedging engagement between the rail members and frame upon closing movement of the gate.

3. In a discharge outlet including a four sided opening defined in part by the side and end walls of a four sided frame having a marginal edge surface extending around the sides of the opening, a sliding gate movably mounted to close the opening and having an upper surface adapted to move in close contact with the marginal edge surfaces upon closure of the gate, and supporting means underlying said gate and terminating at an appreciable distance from the side and end walls and constituting the sole support for said gate in its closed position to thereby provide an overhanging section of gate beyond the underlying support to resiliently engage the edge surface of the side and end walls.

4. In a discharge outlet structure for a load containing hopper having a discharge opening; an outlet frame structure having side and end walls defining a discharge opening, and a gate slidably mounted in said frame structure for closing the opening; said frame being formed of upper and lower sections and having in one of the sides a slot for the accommodation of the gate therethrough and formed on the other three sides with outstanding laterally extending flanges presenting a surface adapted to engage with the upper surface of the gate when the latter is in closed position, said lower section having outstanding flange walls underlying the flange walls of the upper section and secured thereto, and a grill carried by the lower section and lying entirely within the discharge opening and constituting the sole support for said gate in closed position, the sides of said gate being free of lading receiving pockets.

5. In a load containing hopper including a four sided bin leading to a discharge opening, a frame bordering the hopper and having a discharge opening and a gate slidably mounted in the frame to vary the size of the opening, and a supporting grill lying entirely within the discharge area and constituting the sole support for said gate in closed position, the sides of said frame along and below the sides of said gate being free of lading receiving pockets.

References Cited in the file of this patent

UNITED STATES PATENTS

| | | |
|---|---|---|
| 820,240 | Mulock | May 8, 1906 |
| 987,877 | Harrigan | Mar. 28, 1911 |
| 1,956,310 | Boyd | Apr. 24, 1934 |
| 2,043,616 | Hankins | June 9, 1936 |
| 2,094,979 | Dietrichson | Oct. 5, 1937 |